June 26, 1956 P. B. CLARK 2,752,478
CONTACT OR RUNWAY LIGHT
Filed Dec. 2, 1952 5 Sheets-Sheet 1

Fig. 1

INVENTOR.
Philip B. Clark
BY
Arnold J. Ericsen
Attorney

Fig. 2

INVENTOR.
Philip B. Clark
BY Arnold J. Ericsen
Attorney

June 26, 1956  P. B. CLARK  2,752,478
CONTACT OR RUNWAY LIGHT

Filed Dec. 2, 1952  5 Sheets-Sheet 4

INVENTOR.
Philip B. Clark
BY Arnold J. Ericsen
Attorney

June 26, 1956 P. B. CLARK 2,752,478
CONTACT OR RUNWAY LIGHT
Filed Dec. 2, 1952 5 Sheets-Sheet 5

INVENTOR.
Philip B. Clark
BY Arnold J. Ericsen
Attorney

United States Patent Office 2,752,478
Patented June 26, 1956

2,752,478

CONTACT OR RUNWAY LIGHT

Philip B. Clark, South Milwaukee, Wis., assignor to McGraw Electric Company, Milwaukee, Wis., a corporation of Delaware Application December 2, 1952, Serial No. 323,656

23 Claims. (Cl. 240—1.2)

The present invention relates to light projectors, and especially pertains to contact or runway marker lights for use on airports and the like to facilitate landing and takeoff operations of aircraft.

Experience has proven, that in addition to instrument approach systems, traffic control, radio approach and other flying aids, an adequate ground approach and runway lighting system is most essential to assist aircraft pilots to land their planes safely under low visibility conditions caused by fog, snow, rain, smoke, and dust during either daytime or nightime operations. Instrument and radio pilotage equipment is very effective in aiding the modern aircraft to be taken off from fields where there is little ceiling and visibility, and continuing its journey directly and safely to distant points assisted only by radio-range equipped airways. In addition, the aircraft may also be brought down from cruising altitudes over a radio range located adjacent to the destination field to a specified minimum elevation above the airport by execution of standard let down procedures. However, such minimums are from 100 to 500 feet or more above the ground (depending upon the airport and surrounding obstructions), and are the recognized practical minimums to which aircraft can be safely maneuvered on instruments. Very often low visibility conditions brought on by fog, snow, rain, smoke, or dust make that last one hundred or more feet of altitude before reaching a safe stop on the runway a most important technical and safe operating problem. After bringing his aircraft by the radio elements to a lower approach, a pilot must receive sufficient visual information to get a correct perspective of the runway. He must keep his craft level, directed straight towards the proposed landing path, while at the same time he must continuously and quickly ascertain his elevation above ground (his altitude) and also be able to judge his air speed.

Early attempts to solve the problem of making safe landings under poor visibility conditions by visual reference to the ground were directed towards the use of a greater number of higher candlepower lights which were supposed to floodlight the field and outline the runway. However, these attempts to use more and brighter lights only aggravated the low-visibility conditions by illuminatnig the dense atmosphere and accordingly reducing the visual pentration of each light. In addition, uncontrolled lights which were bright enough to be visible at useable distances became so blinding to pilots at close range that a very dangerous condition of reduced visibility range or even momentary blindness was created.

It is common knowledge that the penetration of fog is entirely a function of candlepower, and lights used in an airport lighting system to combat low-visibility conditions must be so designed and controlled that at no time during the landing will any beam of light fall on the eye of the pilot in such degree as to impair the eye's maximum efficiency. Usable light is, therefore, a factor of point candlepower versus background brightness. A point source of light of relatively low candlepower concentrated and directed by proper control can be made more visible and useful than a standard type of non-controlled runway light of a much greater candlepower. Applying this principle to an airport landing light system, where the point of observation is always in a vertical plane down the center of the approaching runway, all contact or runway lights must be so designed and controlled that when any light from the unit reaches any point in the vertical plane, it must have a predetermined uniform value at such point of intersection.

Continued studies and operating practice brought forth the introduction of controlled-beam runway light projectors for providing a glare-free signal to approaching aircraft under even the most adverse weather conditions. These units comprised a lamp and lens system which provided an extremely accurate control of the light beam. A set of these lights installed parallel with one another along both sides of the approach path and runway could be adjusted and controlled to provide correct brightness to the pilot when landing or taking off. Operation of the controlled unit is based on a fundamental accepted formula, such as Allard's Law. In essence, Allard's Law provides that when a light just visible in an obstructing atmosphere, such as fog, is being observed and an uncontrolled light is placed between it and the observer, the light farther away becomes invisible because the light reflected off the atmosphere particles around the nearer light becomes brighter than the light emanating from the more distant source. The halo in fog is caused by light shining on the fog at an angle to the direct line of vision and of such intensity that it is reflected off, or refracted, by the drops of moisture making them visible. When the distribution and intensity of the light source are controlled so that only direct light (with just sufficient candlepower) penetrates to the point of observation, the light appears as a point source and the halo, or fogging, of the atmosphere about it is kept to minimum. Correct beam control minimizes the possibility of a "glare barrage."

Under a controlled system with relatively clear atmospheric conditions, the main light path is projected substantially parallel to the runway at relatively low intensity. Obviously, under restricted visibility the light envelope shrinks with the penetration of the higher candlepower beams being reduced more than that of the lower candle-power beams, according to Allard's Law. Therefore, the effective areas fall away from the center line of the runway. Merely increasing the output of the lamp does not restore the path of equal brightness. Only by refocusing and "toeing in" the path of the maximum candlepower beam towards the center line of the runway, can the relatively darker area be eliminated and the path of equal brightness be restored.

Controlled-beam light projectors have been in use as contact or runway marker lights for an effective length of time to prove their success in operation. However, the installations have proved to be of considerable expense in initial construction costs and subsequent parts replacement and maintenance. In addition, these installations require elaborate control panels, which must be operated with considerable skill for maintaining the correct intensity and beam control setting. In addition, separate pilot control lines are required for separately energizing the beam-control means apart from the circuit energizing the projector lamp.

It is therefore a primary object of the present invention to provide an improved contact or runway light projector which embodies a relatively inexpensive structure incorporating a simple mechanism for controlling the actions of the light source with respect to the lens and/or reflector, and which may be provided to jointly cooperate with the optical system to project a signal at a predetermined intensity and beam direction in relation to the quantity of electrical energy supplied to the light source, or which may operate effectively through a separate pilot control circuit where it is so desired.

It is another object of this invention to provide an improved contact or runway light projector embodying a beam control mechanism which is non-dependent upon elaborate motors, gear trains, or the like which may require considerable attention, replacement and maintenance, and further which mechanism may be readily adapted to jointly respond to the quantity of electrical energy supplied to the light source and further to move that light source with relation to the projector lens in accordance with the degree of energy supplied.

It is a further object of this invention to provide an improved contact or runway light projector in which the light source and the focal axis of the lens are movable relative to one another responsive to the quantity of energy supplied to said light source either through direct electrical connection or from emitted radiation received from said light source.

Other objects and further advantages of this invention are more fully set forth in a description of the accompanying drawing, in which.

Figure 1:
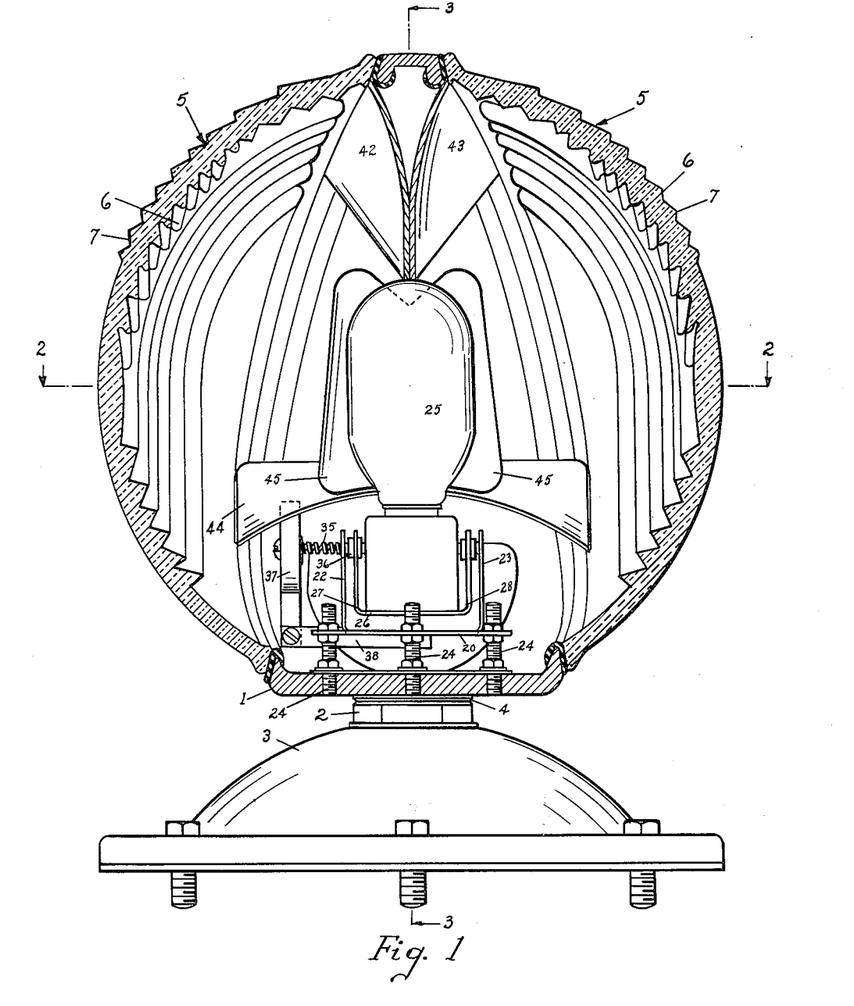
Fig. 1 is an elevational view, partly in section, of a dual-lens runway light utilizing a preferred embodiment of the mechanism for moving the lamp, or light source, with relation to the reflectors and/or lenses.
Figure 2:
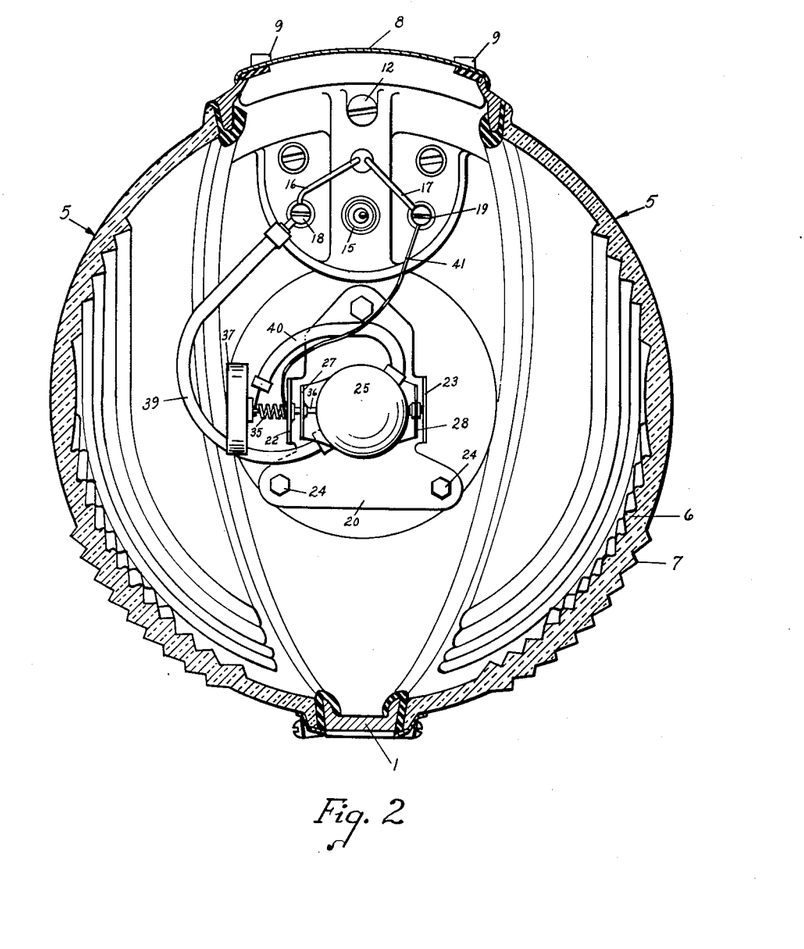
Fig. 2 is a top view, partly in section, of the embodiment of Fig. 1 taken on lines 2—2 of Fig. 1 with the reflectors removed to more clearly set forth the operating mechanism.
Figure 3:
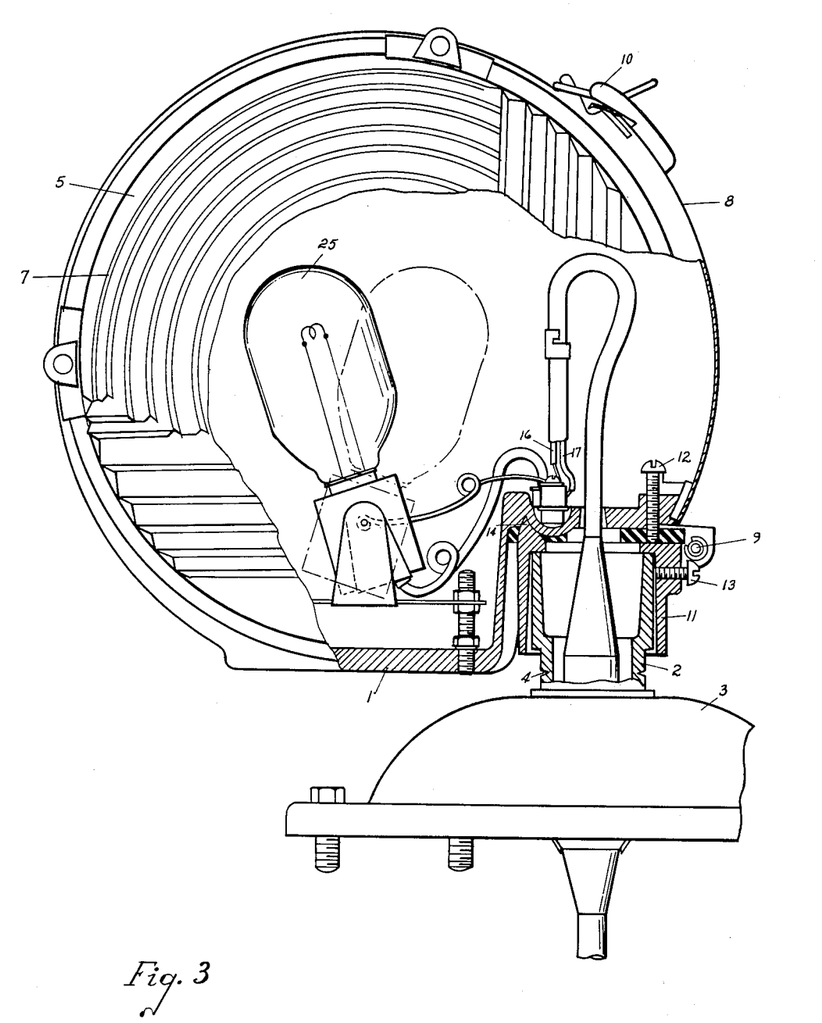
Fig. 3 is an elevational view, partly in section of the embodiment of Fig. 1, taken on lines 3—3 of Fig. 1, and showing the relative movement of the light source with relation to the lens. The reflector elements have again been removed to clearly set forth the operating mechanism.

Referring now to Figs. 1, 2, and 3, the improved contact or runway marker light projector may comprise a cast housing member 1 supported by a vertical support member 2, projecting from a mounting base 3. As shown in Figs. 1 and 3, the vertical support member 2 is preferably provided with an annular break-off groove 4, which is relatively frangible in order to shear at a relatively inexpensive portion of the projector if the projector should be accidently collided with by an approaching airplane, snowplow, or other moving object.

The lens structure 5 is mounted on the housing 1 in the usual manner, and forms a part of the co-pending patent application, Serial No. 328,631, filed by Philip B. Clark on December 30, 1952, and assigned to the same assignee as the present invention. The interchangeable lens structure 5 is fully described and claimed in that copending application. However, the beam-control mechanism for controlling the movement of the light source, which will hereinafter be described in detail, is readily adaptable for use in any conventional beam-control light projector. Suffice it to say for the present, that the lens structure 5 comprises a focusing portion, which includes inner and outer refracting prisms 6 and 7 respectively, a portion of which provides a "bulls-eye" focusing means.

Referring to Fig. 3, the housing 1 is provided with a maintenance-entrance door 8 pivotally mounted on trunnions 9, and engageable with the housing at its free end by means of a conventional latching clamp 10. It is preferable to position the housing 1 on a slip-fitter casting 11 which will permit a convenient means for leveling the projector with reference to the runway and/or remaining projectors in a selected series. Machine screws 12 and 13 operating with relation to the fulcrum 14 may be loosened or tightened to level the projector both vertically and horizontally as will be indicated in the spirit level vial 15, shown in Fig. 2.

Line connections to the projector are made through conventional conductors 16 and 17, one of which may be grounded if so desired. The conductors are electrically connected to upright terminals 18 and 19, respectively. It will be apparent that the base 3 may be mounted directly on an individual transformer (not shown) or connected directly to a multiple circuit (not shown) in the usual manner.

The beam-control mechanism, shown in Figs. 1, 2, and 3, comprises a stationary frame assembly which includes a base 20 with upwardly projecting trunnions 22 and 23 integral therewith. The frame assembly is supported by nut and stud assemblies 24, permitting the mechanisms to be adjustable vertically with respect to the lens 5. The projector lamp assembly 25 is positioned in a U-shaped cradle member including a base portion 26 with supporting leg portions 27 and 28 integral therewith. The cradle assembly is pivotally supported from the trunnions 22 and 23 of the frame assembly.

A very important aspect of the present invention relates to the manner of controlling the movement of the light source with relation to the lens and/or reflectors. A preferred embodiment is shown in Figs. 1, 2, and 3; and, in fact, all of the embodiments disclosed relate to a means for moving the lamp or light source. However, it is within the scope of this invention to provide similar means for moving a lens structure or a reflector structure with relation to the light source (not shown).

Figure 4:
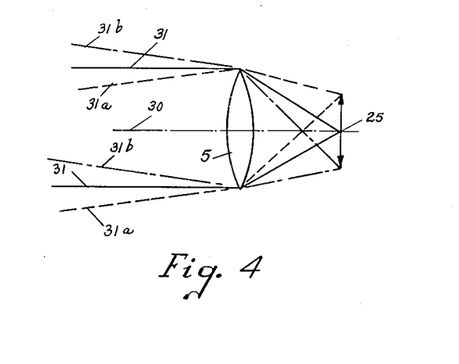
Fig. 4 is a diagrammatic view depicting the angular deflection of a projected light beam on movement of a light source with relation to a lens.

With reference to Fig. 4, it will be seen diagrammatically that movement of the light source, such as the lamp 25, in a direction substantially normal to the focal axis 30 of the lens 5 will cause an angular deflection of the light beam 31 relative to the direction of movement. For instance, if the lamp 25 is moved upwardly, as shown with respect to Fig. 4, the light will be angularly deflected to the position designated by the reference character 31a. Accordingly, movement of the lamp 25 in a downward direction as viewed in Fig. 4 will provide an angular deflection of the light beam to the position designated as 31b. Obviously, similar movement of the lens 5 with respect to the light source 25 will cause a similar deflection of the light beam.

Although the above-described principle of controlling projected light beams by movement of a light source and/or lens relative to one another is well-known, the heretofore method of providing such movement has been relatively expensive, in addition to requiring highly trained personnel for controlling the unit. The prime movers utilized for converting electrical energy into mechanical motion have been in the form of motor driven gear trains or the like, the fabrication of which, requires skilled manufacturing techniques. Such devices also require separate pilot control circuits with complicated appended operating equipment.

The present invention, in its preferred embodiment, contemplates the provision of a prime mover of a current-actuated bimetallic lamp actuator 35, which is caused to torsionally provide rotational motion due to its inherent ohmic resistance. The convenient bimetallic actuator has been clearly disclosed in Figs. 1 and 2, and comprises a helically-wound bimetal strip with the high expansion metal on the outside. One end is fastened to a pivot pin 36 which projects from the support 27, and extends through an opening in the trunnion 22. The opposite end of the member 35 is fastened to the free inner end of a spirally-formed bimetallic compensator 37. The opposite end of the bimetallic compensator is securely fastened to an insulating member 38 projecting from one side of the base 20 of the frame assembly. The compensator 37 has its high expansion metal on the inside of the spiral and is provided to compensate for variations in ambient temperature affecting the actuator 35 by re-indexing the stable end of the helical actuator 35.

As has been previously stated, it has been found that the angle of "toe-in" is a function of the desired beam intensity. Accordingly, it has been found to be desirable to electrically connect the bimetallic actuator 35 in the circuit supplying current to the lamp 25. This will give a functional relationship between movement of the lamp with respect to the lens and the current supplied to the lamp. Obviously, any means for obtaining a functional relationship between the actuator and the current supply may be made with either series or parallel electrical connection, or the actuator may be supplied from a separate pilot circuit control and remain within the broader aspects of the present invention.

As shown, a preferred method of wiring the prime mover and the lamp 25 is to connect one terminal of the lamp through a lead 39 to the upright line terminal 18. Inasmuch as relatively high operating temperatures are encountered, it has been found desirable to provide asbestos-covered leads. The opposite terminal of the lamp is connected through a lead 40 to one end of the bimetal actuator 35. As shown in Fig. 2, the lead 40 is connected at the end of the actuator terminating the compensator 37. The opposite end of the current-responsive bimetallic actuator 35 is connected through a lead 41 to the terminal 19. A convenient and inexpensive electrical circuit may be provided with one "hot" line connection 16 and a ground connection 17. Thus, the lead 41 need not be insulated inasmuch as it is merely a ground connection.

In order to gain full advantage of the light emanating from the lamp 25, a group of light collecting and reflecting reflectors may be provided, as shown in Fig. 1. The uppermost reflector, as viewed in Fig. 1, is composed of two portions 42 and 43 respectively. These portions have a generally concave cross section and are preferably polished to provide specular reflection of light rays which are directed upwardly from the lamp towards the lens 5. A lower reflector 44 is arranged to collect light rays which would ordinarily fall on the relatively dull, light absorbing, beam-control mechanism, and to reflect these rays towards the dual lenses positioned on either side of the lamp 25. There is also shown a reflector 45 which may be positioned between the lamp 25 and the door 8 to reflect light away from the door surface.

Operation of the embodiment disclosed in Figs. 1, 2, and 3 is as follows:

Assume that the projector is electrically connected as is particularly disclosed in Fig. 2. That is, with the prime mover being in series electrical connection with the lamp 25, thereby establishing a closed circuit with the terminals 18 and 19. Thus, in its preferred form, the present invention will provide an angular deflection of the light beam in the manner described with reference to Fig. 4, which deflection will be a function of the intensity of the lamp 25.

It will be apparent that the intensity of the lamp 25 may be varied in the usual manner, as for instance, with the aid of rheostats, variable reactors, and the like (not shown). Because of the series circuit connection, the energy transmitted to the lamp 25 will obviously be reflected in the prime mover circuit through bimetallic actuator 35. Due to the inherent ohmic resistance of the actuator, the difference in the coefficient of expansion between the bi-metallic layers will cause a torsional movement of the actuator. Since one end of the helical bi-metal is semi-stabilized by mechanical connection with the compensator 37, the end of the actuator fastened to the pivot 36 will, therefore, be caused to rotate. This rotational motion will tend to rock the lamp cradle assembly in the direction of rotation.

Airplane landing fields utilizing runway or contact lights are located throughout the various geographical areas of the world ranging from areas with temperate climates to localities having the most extreme temperature conditions. Accordingly, a properly functioning light projector must be made to operate effectively under an extensive range of temperatures. In addition, from a cost standpoint, it is desirable to provide a projector that may be fabricated on an assembly line basis with each fabricated assembly being made to function effectively without requiring more than initial adjustment. In order to provide a light projector capable of operating in any locality, the bi-metallic compensator 37 has been provided to re-index one end of the bi-metallic actuator 35 in accordance with variations in ambient temperature affecting the projector unit. A convenient compensator for the preferred helically-formed actuator 35 may be made in the form of a spiral having one end stationarily mounted with its inner or free end mechanically fastened to the actuator. Inasmuch as it is deemed preferable to provide a bi-metallic actuator with the high expansion metal towards the outside; the compensator, which is not electrically connected, is arranged to oppose the motion of the actuator with the high expansion metal towards the inside.

Contact or runway marker lights are generally positioned in paired relationship with one another transversely of the runway. It is preferable to position the projector with its runway side at the top as viewed in Fig. 2. The lamp 25 will, therefore, be caused to rotate about its pivot, as shown in Fig. 3, with the runway side of the lamp being to the right as viewed therein. Thus, as electrical energy is supplied in increasing amounts to the lamp and to the prime mover, the lamp will move downwardly, as shown in Fig. 2, and in a counterclockwise manner, as illustrated by the full lines in Fig. 3. With reference to Fig. 4, it will be seen that light beams emanating from the projector will take the position designated by the reference character 31b as the current to the lamp and prime mover is increased. Accordingly, the companion lamp (not shown), which is positioned substantially directly opposite the described lamp will also have its beams deflected responsive to the current supplied. Obviously, the companion lamp will be positioned with its axis rotated 180° with respect to the runway and the lamp illustrated in Figs. 1, 2, and 3. However, the runway side will still be at the top as viewed in Fig. 2.

It will be apparent that under low visibility conditions, the intensity of the lamp will be increased; and in accordance with the teachings of this description, the projected light beams will be deflected to toe in with respect to the runway to provide a strong light signal which is composed of the beams emanating from the paired companion projectors.

It will be apparent that a comparative angular deflection will be made with respect to both of the dual lenses 5 where dual projection is desired. The projector will then have a two-purpose function permitting an approach from either direction of the runway in accordance with wind conditions. The particular lens shown is more fully described in the above-mentioned copending application, Serial No. 328,631, filed by Philip B. Clark.

Figure 5:
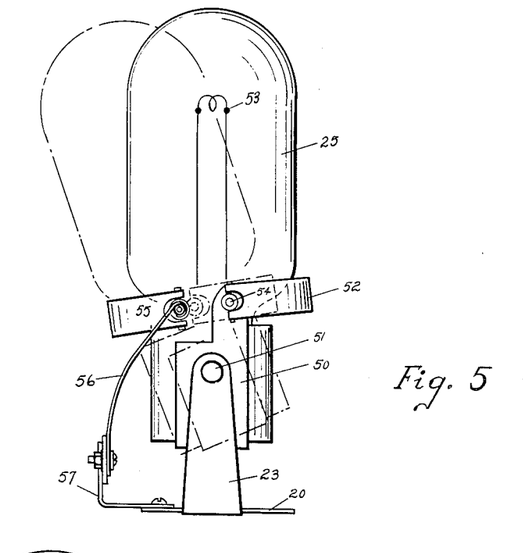
Figs. 5 through 9 are fragmentary views of other embodiments of the beam-control mechanism arranged for actuating the light source in accordance with the present invention.

Referring now to Fig. 5, which discloses another embodiment of the invention, the lamp 25 is adapted to be pivotally supported on a frame assembly similar to that of the preferred embodiment and comprising a base 20 with integrally projecting trunnions 23 on either side thereof. The lamp 25 is mounted in a generally U-shaped cradle assembly 50, pivotally supported on a pivot pin 51.

The prime mover of the embodiment of Fig. 5 is adapted to be actuated calorifically by the heat energy radiated by the lamp 25.

This may be conveniently accomplished in a number of ways, but it is preferable to provide a C-shaped bi-metallic actuator 52, which is positioned circumjacently to the lamp envelope as shown, and in a manner that will not interfere with the major portion of the light rays emanating from the lamp filament 53. One side of the normally non-conducting actuator 52 is pivotally fastened to the cradle assembly 50 by means of a pivot pin 54. The opposite or free end of the bi-metallic actuator is adapted to receive a pivot pin 55, which is jointly fastened to a bi-metallic compensator member 56, where such compensator is desired. The opposite end of the compensator member is preferably stationarily mounted, as for instance, by means of a bracket 57 attached to the base 20 of the frame assembly.

It is preferable to provide a bi-metallic actuator 52 that expands on heating, which will tend to draw the pivots 54 and 55 away from one another as viewed in Fig. 5. The bi-metallic compensator 56 may be provided to compensate for ambient temperature variations by re-indexing the pivot 55 responsive to such variations. The lamp 25 is operated in the position shown by the full lines under normal operating conditions. The dot-dash lines indicate the position of the lamp when no-current conditions exist, and the bi-metallic actuator 52 is relatively cool. When electrical energy is supplied to the lamp 25, the lamp will emit radiant heat energy in addition to light energy. It will be apparent that the light energy and radiant heat will both be substantially proportional to the energy supplied.

Accordingly, the lamp will function as follows: As current is supplied, the lamp will be caused to move from the position shown in the dot-dash lines to the normal operating conditions shown by the full lines, and continue to rotate in a clockwise manner (not shown) about the pivot 51, responsive to the amount of energy supplied.

Figure 6:
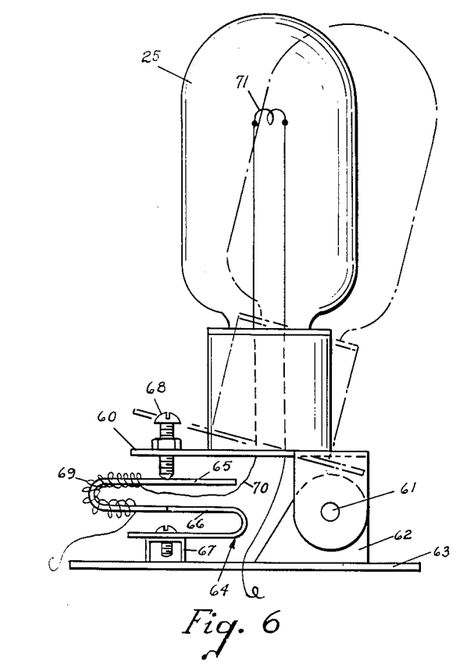

A further embodiment of the present invention has been disclosed in Fig. 6. In this embodiment the lamp 25 is again pivotally actuated by means of a prime mover, which is conjointly energized by the circuit supplying the lamp. However, in this case the prime mover takes the form of a compensated bi-metal actuated by means of an independently energized heater coil. The lamp 25 is positioned on a cradle assembly 60 which is pivotally mounted on a pivot pin 61 positioned in a trunnion 62 integral with a frame assembly base 63.

The prime mover comprises an S-shaped two-portion bi-metal actuator 64. The actuator 64 comprises a U-shaped actuating portion 65 having its high-expansion metal towards the outer side, and which is integrally fastened to a compensator portion 66 having its high-expansion surface towards the inner side. The opposite end of the compensator portion is stationarily fastened by means of a bracket 67 to the base 63 of the frame assembly. The free end of the actuating portion 65 is arranged to engage an adjustable bolt and nut assembly 68, which is adapted to engage a threaded opening in the cradle assembly 60.

The actuating portion 65 of the prime mover is arranged to be thermally responsive to electrical energy supplied to a heater coil 69 which is preferably wound circumjacent thereto, although the coil may be positioned in any convenient manner whereby calorific energy may be conducted to the actuating portion 65. As shown in Fig. 6, the heater coil is electrically connected through a lead 70 to the lamp filament 71 to provide a series electrical connection. However, it will be apparent that the heater coil may be independently actuated by a separate pilot control circuit, if so desired. In addition, a parallel electrical circuit (not shown) may be connected in accordance with the invention.

Thus, the embodiment of Fig. 6 is provided with a prime mover that permits the lamp to rotate about its pivot 61 when the actuator 64 is expanded by the heater coil 69. The degree of rotation with respect to the movement of the bi-metal may be adjusted by means of the nut and bolt assembly 68. As stated above, the actuator portion 65 of the actuator is compensated for variations in ambient temperature by means of the compensator portion 66 integral therewith. As energy is supplied to the heater coil 69 the actuating portion 65 tends to rise and carry with it the cradle assembly 60 to tilt the lamp to the position shown in the dot-dash lines.

Figure 7:
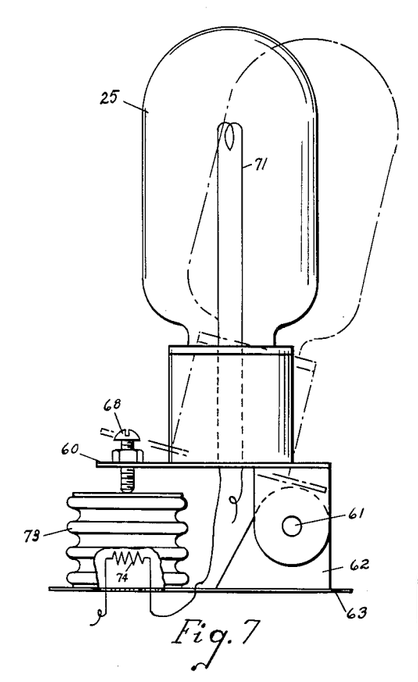

Fig. 7 is illustrative of still another embodiment of the present invention, and relates to a bellows-operated prime mover for the projector lamp 25. The lamp assembly may take substantially the same form as disclosed in Fig. 6. Like parts are accordingly numbered with like reference characters.

A lamp 25 is mounted on a movable cradle assembly 60 which is pivotally positioned on a pivot 61, which is supported by the trunnions 62 projecting upwardly from the base portion 63 of the frame assembly. In this case a vapor-actuated expansible bellows member 73 is provided as a prime mover, and is arranged to engage with the adjustable nut and bolt assembly 68 positioned on the cradle assembly 60. The bellows are formed of a flexible material and may be made expansibly responsive to thermal energy transmitted through a heater coil 74 contained therein. The bellows may be filled or partially filled with a vaporous liquid (not shown), or may be entirely gas-filled. It will be apparent that as energy is supplied by the heater coil 74, the fluid contained in the bellows will be caused to expand on heating, thus forcing the bellows to move upwardly towards engagement with the nut and bolt assembly 68. The consequent rotation of the lamp 25 about its pivot point 61 may thus be made responsive to the degree of expansion of the bellows member 73 reflective of energy supplied to the heater coil 74. Other means of supplying heat energy to the bellows will be apparent, though not shown.

Figure 8:
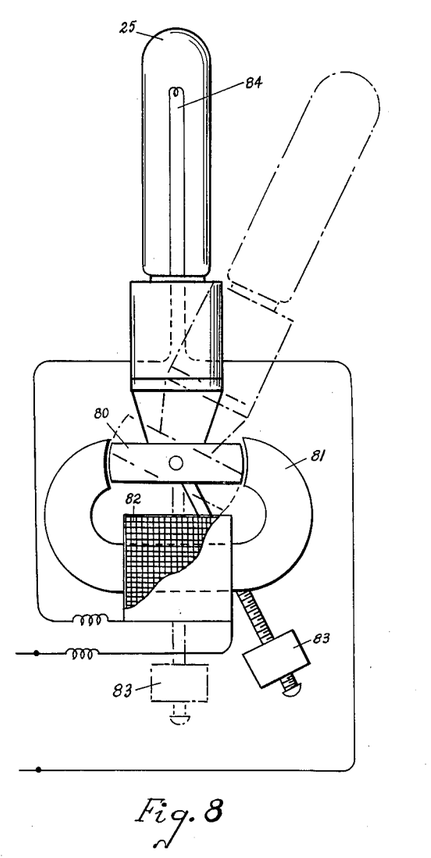
Figure 9:
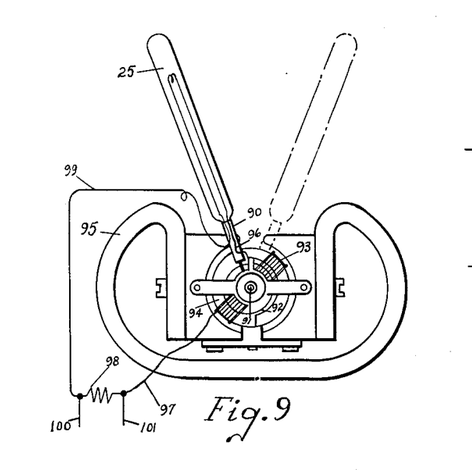

The embodiments of Figs. 8 and 9 relate to electromagnetic devices for actuating the movement of the lamp structure 25. As shown in Fig. 8, the lamp is mounted to move conjointly with the armature 80 of a rotary solenoid. The solenoid further comprises a core member 81 having a coil 82 wound on one leg thereof. A counterbalanced pendulum 83 is preferably provided for the lamp 25. The pendulum 83 is preferably of an adjustable type for changing the center of gravity according to given conditions.

As viewed in Fig. 8, the coil 82 of the solenoid is connected in series with the filament 84 of the lamp 25, but it is understood that the coil may be independently connected to a pilot circuit if so desired. It is within the broad aspects of the invention to include any type of a solenoid arrangement for actuating the movement of the lamp.

Fig. 9 discloses another variation of an electro-magnetic prime mover, which is based on the D'Arsonval principle of operation and comprises an actuator which is substantially identical to a conventional ammeter of the moving-coil variety.

As disclosed, the embodiment of Fig. 9 incorporates a projector lamp 25 adapted to be actuated responsive to the rotational movement of the projecting pivoted arm 90, which is mounted on a pivot pin 91. The pivot pin and arm are actuated by the motion of a torsional spring 92 connected with a moving coil 93 wound longitudinally of the axis of the armature 94. The electro-magnetic field is provided by a magnetic core member 95.

A preferable method of electrically connecting the prime mover of the lamp is by means of a flexible lead 96 connected to the lamp circuit through the torsional spring 92, and from the moving coil 93 through a lead 97 to a shunt resistor 98. A lead 99 connects the lamp filament to the opposite side of the shunt 98. Line connections may be made on either side of this resistor by means of leads 100 and 101. The resistor 98 may be of the usual type provided for protecting ammeters that are subjected to relatively heavy line currents.

It will be apparent that the movement of the lamp from the position shown in the full lines to that shown in the dot-dash lines will be directly responsive to current supplied the ammeter-type device. If it is so desired, the connection may be made through a separate pilot control circuit.

Although the light source has been shown as a lamp mounted on a pivotably movable structure, it will be apparent that the various embodiments of the control mechanism are each readily adaptable for providing movement of the lamp with respect to the lens in any of various ways. Lateral movement of the lamp (not shown) may be had through linkages, gear trains, etc., without requiring extensive modification of the lamp components hereinabove described.

It will be apparent that the present invention, in its various embodiments described above with reference to the appended drawings, provides an improved signal projector in the form of an airport runway light which is readily adaptable for use in conjunction with established practice, and which projector may be substituted for or used jointly with existing controlled-beam runway or contact lights. The subject light provides a marked improvement over conventional projectors which are considerably more expensive to manufacture and involve relatively complex beam-control mechanisms. The improved projector is versatile, in that it may be electrically connected directly in the circuit normally energizing the light source which negates the added expense and materials for separate control circuits; or the projector may be readily adapted for connection with proposed or existing circuits utilizing separate pilot control lines and equipment, if so desired.

I claim:

1. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light intensity of said filament, and means responsive to variations in current in said filament for controlling the relative movement of said lamp and lens, whereby said light signal may be automatically angularly deflected inwardly of said runway as the intensity of light emanating from said filament increases responsive to increased current supplied thereto.

2. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp being movable transversely of said geometric axis for projecting said light signal in a predetermined direction relative to said runway at a predetermined light intensity of said filament, and means responsive to variations in current in said filament for controlling said transverse movement of said lamp, whereby said light signal may be automatically angularly deflected inwardly of said runway as the intensity of light emanating from said filament increases responsive to increased current supplied thereto.

3. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp being movable transversely of said geometric axis for projecting said light signal in a predetermined direction relative to said runway at a predetermined light intensity of said filament, and means in electrical connection with said lamp filament and arranged to move said lamp relative to said geometric axis responsive to variations in current in said filament, whereby said light signal may be automatically angularly deflected inwardly of said runway as the intensity of light emanating from said filament increases responsive to increased current supplied thereto.

4. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light intensity of said filament, means including a bimetallic actuator responsive to variations in current in said filament for controlling the relative movement of said lamp and lens, whereby said light signal may be automatically angularly deflected inwardly of said runway as the intensity of light emanating from said filament increases responsive to increased current supplied thereto.

5. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp being movable transversely of said geometric axis for projecting said light signal in a predetermined direction relative to said runway at a predetermined light intensity of said filament, and means including a bi-metallic actuator responsive to variations in current in said filament for controlling said transverse movement of said lamp, whereby said light signal may be automatically angularly deflected inwardly of said runway as the intensity of light emanating from said filament increases responsive to increased current supplied thereto.

6. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light intensity of said filament, and means operatively related to said lamp and lens including a bi-metallic element arranged to translate electric energy supplied thereto into mechanical motion by means of its inherent ohmic resistance, said means being responsive to variations in current in said filament for controlling said transverse movement, whereby said light signal may be automatically angularly deflected inwardly of said runway as the intensity of light emanating from said filament increases responsive to increased current supplied thereto.

7. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp being movable transversely of said geometric axis for projecting said light signal in a predetermined direction relative to said runway at a predetermined light intensity of said filament, and means for moving said lamp including a bi-metallic element arranged to translate electric energy supplied thereto into mechanical motion by means of its inherent ohmic resistance, said means being responsive to variations in current in said filament for controlling said transverse movement, whereby said light signal may be automatically angularly deflected inwardly of said runway as the intensity of light emanating from said filament increases responsive to increased current supplied thereto.

8. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light intensity of said filament, and means operatively related to said lamp and lens including a bi-metallic element and an electric heater coil for thermally actuating said bi-metallic element, said means being responsive to variations in current in said filament for controlling said transverse movement, whereby said light signal may be automatically angularly deflected inwardly of said runway as the intensity of light emanating from said filament increases responsive to increased current supplied thereto.

9. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp being movable transversely of said geometric axis for projecting said light signal in a predetermined direction relative to said runway at a predetermined light intensity of said filament, and means for moving said lamp including a bi-metallic element and an electric heater coil for thermally actuating said bi-metallic element, said means being responsive to variations in current in said filament for controlling said transverse movement, whereby said light signal may be automatically angularly deflected inwardly of said runway as the intensity of light emanating from said filament increases responsive to increased current supplied thereto.

10. A marker light for an airport runway including in combination a lamp having a light emitting filament arranged for connection with an electric circuit having an infinitely variable control with predetermined maximum and minimum variable limits, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light intensity of said filament, and a prime mover operatively related to said lamp and lens and responsive to variations in current in said filament for controlling said transverse movement, and an ambient temperature compensator for said prime mover, whereby said light signal may be automatically angularly deflected inwardly of said runway as the intensity of light emanating from said filament increases responsive to increased current supplied thereto.

11. A marker light for an airport runway including in combination a lamp having a light emitting filament arranged for connection with an electric circuit having an infinitely variable control with predetermined maximum and minimum variable limits, a lens having a focusing portion for projecting a light signal emanating from said filament in a predetermined direction relative to the geometric axis of said lens, said lamp being movable transversely of said geometric axis for projecting said light signal in a predetermined direction relative to said runway at a predetermined light intensity of said filament, and a prime mover for moving said lamp responsive to variations in current in said filament for controlling said transverse movement, and an ambient temperature compensator for said prime mover, whereby said light signal may be automatically angularly deflected inwardly of said runway as the intensity of light emanating from said filament increases responsive to increased current supplied thereto.

12. A marker light for an airport runway including in combination a lamp having a light emitting filament arranged for connection with an electric circuit having an infinitely variable control with predetermined maximum and minimum variable limits, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light intensity of said filament, and a bimetallic actuator operatively related to said lamp and lens and responsive to variations in current in said filament for controlling said transverse movement, and an ambient temperature compensator for said actuator, whereby said light signal may be automatically angularly deflected inwardly of said runway as the intensity of light emanating from said filament increases responsive to increased current supplied thereto.

13. A marker light for an airport runway including in combination a lamp having a light emitting filament arranged for connection with an electric circuit having an infinitely variable control with predetermined maximum and minimum variable limits, a lens having a focusing portion for projecting a light signal emanating from said filament in a predetermined direction relative to the geometric axis of said lens, said lamp being movable transversely of said geometric axis for projecting said light signal in a predetermined direction relative to said runway at a predetermined light intensity of said filament, and a prime mover for moving said lamp comprising a bi-metallic element arranged to translate electric energy supplied thereto into mechanical motion by means of its inherent ohmic resistance and being responsive to variations in current in said filament for controlling said transverse movement, and an ambient temperature compensator for said prime mover, whereby said light signal may be automatically angularly deflected inwardly of said runway as the intensity of light emanating from said filament increases responsive to increased current supplied thereto.

14. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light intensity of said filament, and means operatively related to said lamp and lens including a hydraulically operated actuator operated under the influence of a thermally expansible fluid associated therewith, said actuator being arranged to translate calorific energy supplied thereto into mechanical motion on thermal expansion of said fluid, said means being responsive to variations in current in said filament for controlling said transverse movement, whereby said light signal may be automatically angularly deflected inwardly of said runway as the intensity of light emanating from said filament increases responsive to increased current supplied thereto.

15. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp being movable transversely of said geometric axis for projecting said light signal in a predetermined direction relative to said runway at a predetermined light intensity of said filament, and means for moving said lamp including a hydraulically operated actuator operated under the influence of a thermally expansible fluid associated therewith and an electric heater coil in electrical connection with said lamp filament for effecting thermal expansion of said fluid responsive to current supplied thereto, whereby said light signal may be automatically angularly deflected inwardly of said runway as the intensity of light emanating from said filament increases responsive to increased current supplied thereto.

16. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light intensity of said filament, and means including an electromagnetic actuator operatively related to said lamp and lens and responsive to variations in current in said filament for controlling said transverse movement, whereby said light signal may be automatically angularly deflected inwardly of said runway as the intensity of light emanating from said filament increases responsive to increased current supplied thereto.

17. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp being movable transversely of said geometric axis for projecting said light signal in a predetermined direction relative to said runway at a predetermined light intensity of said filament, and means including an electromagnetic actuator for moving said lamp and responsive to variations in current in said filament for controlling said transverse movement, whereby said light signal may be automatically angularly deflected inwardly of said runway as the intensity of light emanating from said filament increases responsive to increased current supplied thereto.

18. A marker light for an airport runway including in combination a lamp having a light emitting filament arranged for connection with an electric circuit having an infinitely variable control with predetermined maximum and minimum variable limits, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light intensity of said filament, and a prime mover comprising an electrically actuated helically-formed bi-metallic element adapted to provide torsional movement on heating due to its inherent ohmic resistance, said element being in electrical connection with said filament for controlling said transverse movement, and an ambient temperature compensating bi-metallic element operatively associated with said helically-formed bi-metallic element, whereby said light signal may be automatically angularly deflected inwardly of said runway as the intensity of light emanating from said filament increases responsive to increased current supplied thereto.

19. A marker light for an airport runway including in combination a lamp having a light emitting filament arranged for connection with an electric circuit having an infinitely variable control with predetermined maximum and minimum variable limits, a lens having a focusing portion for projecting a light signal emanating from said filament in a predetermined direction relative to the geometric axis of said lens, said lamp being movable transversely of said geometric axis for projecting said light signal in a predetermined direction relative to said runway at a predetermined light intensity of said filament, a prime mover for moving said lamp comprising an electrically actuated helically-formed bi-metallic element adapted to provide torsional movement on heating due to its inherent ohmic resistance, said element being in electrical connection with said filament for controlling said transverse movement, and an ambient temperature compensating bi-metallic element operatively associated with said helically-formed bi-metallic element, whereby said light signal may be automatically angularly deflected inwardly of said runway as the intensity of light emanating from said filament increases responsive to increased current supplied thereto.

20. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light intensity of said filament, and means operatively related to said lamp and lens including a bi-metallic element positioned in the proximity of said lamp, said means being responsive to radiant calorific energy emitted by said filament for controlling said transverse movement, whereby said light signal may be automatically angularly deflected inwardly of said runway as the intensity of light emanating from said filament increases responsive to increased current supplied thereto.

21. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light intensity of said filament, and means operatively related to said lamp and lens including a bi-metallic element positioned in the proximity of said lamp, said means being responsive to radiant calorific energy emitted by said filament for controlling said transverse movement, and an ambient temperature compensator for said bi-metallic element, whereby said light signal may be automatically angularly deflected inwardly of said runway as the intensity of light emanating from said filament increases responsive to increased current supplied thereto.

22. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light intensity of said filament, and means operatively related to said lamp and lens including a rotary solenoid in electrical connection with said lamp circuit, said means being responsive to variations in current in said filament for controlling said transverse movement, whereby said light signal may be automatically angularly deflected inwardly of said runway as the intensity of light emanating from said filament increases responsive to increased current supplied thereto.

23. A marker light for an airport runway including in combination a lamp having a light emitting filament, means including a variable control device for varying the current to said filament, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light intensity of said filament, and means operatively related to said lamp and lens including a bellows member containing an expansible fluid and having a heating element for expanding said fluid responsive to electrical energy supplied thereto, said heater element being in electrical connection with said lamp filament for controlling said transverse movement, whereby said light signal may be automatically angularly deflected inwardly of said runway as the intensity of light emanating from said filament increases responsive to increased current supplied thereto.

References Cited in the file of this patent

UNITED STATES PATENTS

| | | |
|---|---|---|
| 1,398,292 | Arbuckle | Nov. 29, 1921 |
| 1,700,226 | House | Jan. 29, 1929 |
| 1,861,752 | Patterson | June 7, 1932 |
| 2,022,295 | Melish | Nov. 26, 1935 |
| 2,556,870 | Clark | June 12, 1951 |

FOREIGN PATENTS

| | | |
|---|---|---|
| 722,570 | France | Mar. 22, 1932 |

OTHER REFERENCES

Landing Aids Experiment Station final report for 1947 on Airfield Lighting, pp. 7 and 8 cited.